2,876,263
Patented Mar. 3, 1959

2,876,263

POLYOXYALKYLENE CYCLIC HYDROCARBON SUBSTITUTED AMINES AND THEIR AMMONIUM SALT DERIVATIVES

Victor Mark, Riverside, Ill., assignor to Universal Oil Products Company, Des Plaines, Ill., a corporation of Delaware No Drawing. Application December 31, 1952
Serial No. 329,091

10 Claims. (Cl. 260—573)

This invention relates to a novel class of amines having surface active properties which are formed by the condensation of a polyoxyalkylene glycol or alkylene oxide with a cyclic hydrocarbon amine. The invention also relates to the ammonium salts derived from the above-indicated amines by reaction of the amine with an acid-acting compound under conditions whereby the amine is converted to the corresponding ammonium cationic salt thereof.

This invention concerns an homologous series of compounds characterized as amines and their corresponding ammonium salt derivatives containing one or two hydrocarbon substituents attached to the amino nitrogen atom as a hydrophobic group and containing one or two polyoxyalkylene chains attached to the same nitrogen atom as the hydrophilic portion of the compound. These compounds in general have surface active properties and in particular instances act as detergents in aqueous solution. One series of the present compounds, herein characterized as cyclic hydrocarbon substituted amines, which act as non-ionic or slightly cationic surface active agents in aqueous solution, have the folowing structure:

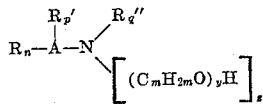

Another series of the present compounds have cationic properties in aqueous solutions thereof and may be considered as ammonium salt derivatives of the above substantially non-ionic compounds. These compounds have the following general structure:

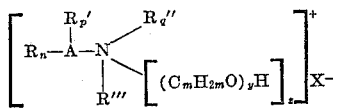

In the above compounds, R, R' and R'' are each and independently selected from hydrocarbon groups containing from 1 to about 20 carbon atoms per group, said groups R, R' and R'' containing a total of at least 5 carbon atoms, A is an aromatic or hydroaromatic radical of either mononuclear or poly-nuclear structure, $n$ and $p$ are independently chosen numerals selected from 0, 1 and 2, Z is 1 or 2, $q$ is equal to 2—Z, $m$ is a whole number having a value of from 2 to 5, $y$ is a whole number having a value from 2 to about 30, R''' is selected from the group consisting of hydrogen, alkyl and aralkyl containing from 1 to 20 carbon atoms, and X is an organic or inorganic mono- or polyvalent anionic radical such as formate, acetate, propionate, and other fatty acid derived anions, oxalate, laurate, phenylsulfonate, benzoate, naphthenate, nitrite, borate, sulfate, sulfonate, halide, nitrate, sulfite, carbonate, etc.

In one of its embodiments the present invention concerns a compound selected from the cyclic hydrocarbon-mono- and di-polyoxyalkylene N-substituted monoamines and the ammonium salt derivatives thereof, said compound containing a cyclic hydrocarbon radical and at least one omega-hydroxyalkylpolyoxyalkylene radical attached to the amino nitrogen atom thereof, the polyoxyalkylene radical being further characterized in that it contains an average of from 1 to about 30 oxyalkylene units per radical, each unit containing from 2 to 5 carbon atoms.

A more specific embodiment relates to a composition of matter comprising a compound having the structure of an N, N-dipolyoxyethylene-ω-hydroxyethyl-alkylaniline, the alkyl substitutent of the aryl nucleus containing from about 6 to about 15 carbon atoms and each of said polyoxypolyethylene N-substituents containing an average of from 1 to about 20 oxyethylene units.

The compounds of the present invention which possess surface active properties and particularly detergency in aqueous solutions thereof may be formed by several alternative procedures, although the procedure involving the following sequence of steps is generally considered the most direct in producing the preferred products of the present invention containing one or two long chain alkyl substituents on the cyclic hydrocarbon nucleus: (1) alkylating a cyclic hydrocarbon selected from the mono- and di-cyclic aromatic hydrocarbons containing at least two replaceable nuclear hydrogen atoms with an olefinic hydrocarbon alkylating agent containing from 5 to about 9 carbon atoms in the case of utilizing a di-nuclear cyclic hydrocarbon feed stock, and from about 6 to about 20 carbon atoms per molecule in the case of utilizing a mono-cyclic aromatic hydrocarbon, said alkylation being effected in the presence of an alkylation catalyst at condensation reaction conditions, (2) subjecting the resulting alkyl-substituted cyclic hydrocarbon containing one and not more than two long-chain nuclear alkyl substituents derived from the olefinic hydrocarbon alkylating agent to nitration at reaction conditions sufficient to introduce a single nitro radical on the cyclic hydrocarbon nucleus, (3) reducing the nitro radical of the resulting nitro alkyl cyclic hydrocarbon to an amino group by subjecting said nitration reaction product to hydrogenation thereby forming the amine corresponding to the nitro substituted alkylcyclic hydrocarbon, and (4) thereafter reacting the amino-substituted alkylcyclic hydrocarbon with an alkylene oxide or a polyoxyalkylene glycol of the desired chain-length to form the omega-hydroxy-polyoxyalkylene condensation product of the cyclic hydrocarbon amine. If the mono- or dicyclic alkyl naphthenes are desired as the alkyl substituted cyclic hydrocarbon portion of the molecule, the corresponding alkyl mono- or dicyclic nitro-aromatics formed as a result of the preceding alkylation and nitration sequence of reactions may be hydrogenated both to saturate the aromatic ring and to reduce the nitro group to an amino radical. The above series of reactions, wherein a di-hydrogen containing amino-substituted alkylcyclic hydrocarbon is formed as an intermediate product of the reaction, contains two omega-hydroxy-polyoxyalkylene chains on the amino nitrogen atom. In the event that a single polyoxyalkylene chain is desired on the amino nitrogen atom, the starting material is a secondary amine wherein one of the hydrogen atoms of the intermediate amine is replaced by a non-condensable hydrocarbon radical selected from alkyl, aryl, aralkyl, or alkaryl, which do not undergo condensation with the alkylene oxide or polyoxyalkylene glycol reactant. The single, remaining hydrogen substituent on the amino group therefore undergoes condensation with the alkylene oxide or glycol to form a mono-polyoxyalkylene-substituted amine. The product of the above series of reactions is a slightly cationic compound (i. e. ionizes slightly in aqueous solution due to the tervalent nitrogen atom in its structure) and is an effective water soluble detergent. When a cationic product is desired, the previously formed intermediate product containing a tervalent amino nitrogen atom having an unshared pair of electrons is further reacted with an acid-acting compound which converts the unshared pair of electrons on the amino nitrogen atom into a pair of electrons shared by a hydrogen atom or a hydrocarbon radical, thereby converting the cyclic hydrocarbon amine to an ammonium salt capable of ionizing in an aqueous solution to an ammonium cation associated with an anion derived from the acid-acting compound. Thus, the slightly cationic amine compound may be reacted with a molar equivalent of an acid, such as hydrochloric acid, hydrobromic acid, nitric acid, benzene sulfonic acid and sulfuric acid, or with another acid-acting compound such as an alkyl halide or aralkyl halide or sulfate to convert the amine into a cationic ammonium salt.

It is to be noted that although long chain alkyl-substituted cyclic hydrocarbon amines containing a single long chain alkyl substituent having from about 5 to about 20 carbon atoms per alkyl group on the cyclic hydrocarbon ring, are generally the preferred species of the present surface active agents because of their highly effective detersive properties, the present invention also relates to other species of compounds useful as wetting agents, emulsifying agents etc. which contain no long chain alkyl radical substituted directly on the cyclic hydrocarbon nucleus, but rather, in a hydrocarbon radical substituted on the amino nitrogen atom. Other species of the present series of compounds are the polyalkyl substituted cyclic hydrocarbon amines, containing multiple nuclear alkyl substituents and one or two polyoxypolyalkylene groups on the amino nitrogen atom. Thus, the invention also concerns compounds of the type having the following general structure:

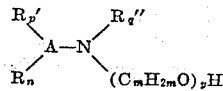

wherein $n$ and $p$ are zero, $q$ is 1, and $R''$ is alkyl containing from 1 to about 20 carbon atoms, aryl, aralkyl, or alkylaryl, said compounds being effective wetting agents. When $R''$ is a long chain alkyl group, such as a $C_9$ to $C_{20}$ radical, the products usually possess detergency. Still another species of this invention are the compounds represented by the above formula in which $n$ and $p$ are at least 1 and $q$ is zero or 1, provided that the sum of the number of carbon atoms in R and R' and R'' is at least 5 in order for the products to possess any significant degree of detergency.

Other forms of the present products have the following structural formula:

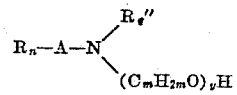

and

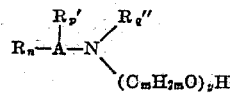

wherein the radicals R and R' are alkyl groups containing from 1 to 20 carbon atoms per group and R'' has the same designation as above. Generally, it is preferred that when one of the groups: R, R' or R'' is a long chain alkyl group containing 5 or more carbon atoms, the other radicals of the group are hydrogen or short chain alkyl groups such as methyl, ethyl, propyl, butyl, or amyl, although the effectiveness of the product is not necessarily limited to such structural configurations.

Cyclic hydrocarbon compounds, comprising one of the primary charging stocks to the alkylation stage of the present process in which the intermediate long-chain alkyl cyclic hydrocarbon is formed, are characterized generally as cyclic hydrocarbons containing at least 2 nuclearly replaceable hydrogen atoms on the cyclic hydrocarbon nucleus and may in addition, contain other nuclear alkyl substituents. Typical specific examples of such cyclic hydrocarbons utilizable as the alkyl acceptor reactant in the alkylation stage of the process include members not only of the benzene series, that is, the mono-cyclic aromatic compounds, but also includes polycyclic aromatics such as, for example, members of the naphthalene series, the anthracene and phenanthrene series, the biphenyl series, the tetrahydronaphthalene series, and the like. Thus, typical compounds utilizable in the process include such hydrocarbons as benzene, toluene, ethylbenzene, propylbenzene, (such as cumene and 1-phenylpropane), butylbenzenes, such as 1-phenylbutane, sec-butylbenzene, tert-butylbenzene; dialkylbenzenes such as ethyltoluene etc.; naphthalene; the various alkyl naphthalenes such as methyl and ethyl naphthalene; phenanthrene and the alkyl-phenanthrenes; the partially hydrogenated polynuclear aromatic hydrocarbons containing at least one aromatic ring, such as 1,2,3,4-tetra-hydronaphthalene, etc.; and the higher alkyl-substituted cyclic hydrocarbons of the above series. Compounds of this invention containing a naphthene ring or a partially hydrogenated polynuclear aromatic ring system are formed by hydrogenating the corresponding aromatic compounds following the introduction of the amino group into the ring of the aromatic compound via nitration and reduction of the nitro group to an amino radical.

The unsubstituted and lower alkyl-substituted cyclic hydrocarbons utilizable as starting materials in the present process may generally be obtained from naturally occurring sources of hydrocarbons, for example, by separating the hydrocarbon from a petroleum-derived fraction, as in the case of benzene, toluene, xylene, naphthalene, which are present in petroleum crudes and particularly in certain fractions of reformed or hydroformed gasolines. The higher alkyl cyclic hydrocarbons, containing one or more alkyl substituents of four or more carbon atoms per alkyl group generally are difficult to separate in a pure form from naturally occurring sources of such hydrocarbons and generally must be produced by synthesis from the unsubstituted or lower alkyl substituted cyclic hydrocarbons. One of the most readily available methods for synthesizing higher (or long-chain) alkyl-substituted cyclic hydrocarbons involves alkylating the unsubstituted or lower alkyl-substituted cyclic hydrocarbon containing at least two nuclearly replaceable hydrogen atoms with an alkylating agent (preferably a mono-olefin) having an alkyl group condensable with the cyclic hydrocarbon under alkylating reaction conditions. Thus, a long-chain alkyl group, for example one containing from 5 to about 20 carbon atoms per group, and generally not more than two of such groups, may be substituted on the cyclic hydrocarbon nucleus to provide an alkylate containing one or two long chain alkyl groups per molecule. Suitable olefinic hydrocarbon alkylating agents may be selected from the straight chain or branched chain olefinic hydrocarbons which may be obtained from various sources, such as from petroleum and its conversion products or from the products formed by dehydration of long-chain alcohols, dehydrohalogenation of alkyl halides, and from other well-known sources. For the cyclic hydrocarbons containing a single ring nucleus, the olefinic alkylating agent preferably contains from about 9 to about 20 carbon atoms per molecule, and preferably, from about 9 to about 15 carbon atoms. For the bicyclic hydrocarbon charging stocks, the olefinic hydrocarbon alkylating agent preferably contains from about 5 to about 9 carbon atoms. This difference in the required chain length of the olefinic alkylating agent for the mono-cyclic as contrasted to the bicyclic hydrocarbons is determined by the combined effect of the alkyl and cyclic nuclear hydrocarbon portions of the molecule on their hydrophobic properties and their effect on the solubility of the ultimate product in water. In general, if the final product is to have surface activity and particularly, if it is to have detersive properties in an aqueous solution thereof, the hydrophobic effect of the alkyl cyclic hydrocarbon portion of the molecule must balance the hydrophilic effect of the omega-hydroxy-polyoxyalkylene chain substituted on the nitrogen atom. Thus, if a detergent product is to be prepared from a benzene hydrocarbon, the alkylating agent is selected on the basis of its effect in contributing to the proper balance of the hydrophobic and hydrophilic radicals in the molecule of the final detergent product, and its molecular weight will usually be different in the case of cyclohexane or benzene than in the case of naphthalene. On the other hand, the proper hydrophobic-hydrophilic balance for optimum surface activity may also be obtained by varying the length of the polyoxypolyalkylene chain; that is, by increasing the number of hydrophilic oxyalkylene units per chain. The more hydrophilic the omega-hydroxy-alkylpolyoxypolyalkylene chain, the larger the hydrophobic alkyl substituent may be; that is, a greater number of carbon atoms in the alkyl substituent may be tolerated in order for the product to possess detergency. The hydrophilicity of the polyoxypolyalkylene group may, in general, be increased by increasing the percentage amount of oxygen in the chain; this can be realized by providing a lower oxyalkylene unit in the condensation reaction of the glycol or alkylene oxide with the primary or secondary amine or by increasing the number of such units in the omega-hydroxy-polyoxypolyalkylene chain.

The preparation of long chain alkyl-substituted cyclic hydrocarbon starting materials by the alkylation of a mono- or di-cyclic aromatic hydrocarbon with a long-chain olefin is effected in a preliminary stage of the process by contacting a mixture of the aromatic hydrocarbon and olefinic hydrocarbon alkylating agent with a condensation catalyst, characterized as an acidic or acid-acting substance, utilizing at least equimolecular proportions of the aromatic hydrocarbon to the olefinic hydrocarbon alkylating agent, and preferably, from about 1.5 mols of aromatic hydrocarbon per mol of olefinic alkylating agent to about 30 to 1 molar proportions thereof. Suitable acid-acting condensation catalysts for effecting the alkylation reaction are well-known in the art and include, among others, liquid hydrogen fluoride or hydrofluoric acid containing not more than 10% by weight of water, boron trifluoride, concentrated sulfuric acid, of 85 to 100% sulfuric acid concentration, aluminum chloride, aluminum bromide and others well known for catalyzing the alkylation reaction. The catalyst is desirably present in the alkylation reaction mixture in an amount of from about 0.1 to about 1.5 pounds of catalyst per pound of olefinic hydrocarbon alkylating agent. The reaction is effected at temperatures of from about −30° to about 100° C., and preferably at temperatures of from about 0° to about 50° C. The alkylate separates as a distinct phase from the used catalyst phase and may be further fractionated to prepare a more desirable fraction for preparation of the product.

A single amino group is introduced on the aromatic hydrocarbon nucleus by subjecting the aromatic hydrocarbons, such as the previously formed alkylate, to nitration under conditions suitable to introduce a single nitro group on the hydrocarbon ring, and thereafter subjecting the nitrated hydrocarbon to hydrogenation at conditions sufficient to reduce the nitro group to the corresponding amino radical. Alternatively, the nitro group may be present on the ring of the initial aromatic hydrocarbon charging stock which may thereafter be subjected to alkylation to introduce the long-chain alkyl group on the ring when compounds of such structure are desired.

Nitration of the aromatic hydrocarbon starting material may be effected by any suitable means in accordance with processes well established in the art for nitration of aromatic hydrocarbons. One of the preferred nitration procedures comprises reacting the aromatic hydrocarbon at a temperature of from about 0° to about 150° C. and at a superatmospheric pressure, if necessary to maintain liquid phase conditions, with a nitrating agent, such as a mixture of concencentrated nitric and sulfuric acids, accompanied by rapid stirring of the reaction mixture. The nitrating agent preferably contains from about 5% to about 25% of concentrated sulfuric acid and a sufficient amount of concentrated nitric acid to effect mono-nitration of the hydrocarbon, generally in amounts of from about 1.5 to about 4.5 mols of nitric acid per mol of the aromatic hydrocarbon charged to the nitration reaction. The resulting nitro aromatic hydrocarbon is generally immiscible in the mixture of acids and may be readily separated therefrom by simple decantation.

The selective reduction of the nitro group in the resultant product to form the mono-amino substituted aromatic hydrocarbon is also accomplished by methods well known in the art, generally by catalytic reduction with hydrogen. One of the preferred procedures comprises passing the mono-nitro aromatic hydocarbon over a hydrogenation catalyst in the presence of hydrogen, generally at a superatmospheric pressure of from about 5 to about 100 atmospheres and at a temperature of from about 0° to about 350° C. Suitable hydrogenation catalysts for this purpose include one or more metal or metal oxides selected from the platinum and iron group metals of the periodic table, including platinum, palladium, nickel and/or cobalt etc. deposited on a refractory metal oxide support such as silica and/or alumina.

When a compound characterized as having a naphthenic cyclic ring (hydroaromatic) is desired as the ultimate product, the mono-nitro substituted aromatic hydrocarbon is subjected to more rigorous hydrogenation or reduction with hydrogen whereby not only the nitro group is reduced to the corresponding amino radical, but the aromatic ring is also hydrogenated to a naphthene. For this purpose the hydrogenation in the presence of the aforementioned hydrogenation catalyst is effected at temperatures of from about 50° to about 200° C., preferably at temperatures of from about 100° to about 150° C. utilizing hydrogen pressures of from about 10 to about 500 atmospheres. The resulting product contains a single nuclear amino group per molecule condensable with the glycol or alkylene oxide to form an omega-hydroxyalkylpolyoxypolyalkylene chain attached to the amino nitrogen atom, as hereinafter described. An alternative procedure for the production of a hydroaromatic amine type of compound as the ultimate product of the process comprises hydrogenating the aromatic-polyoxyalkylene amine condensation product under conditions whereby the aromatic ring is reduced with hydrogen, generally in the presence of a suitable hydrogenation catalyst, such as a group VIII metal of the periodic table composited with a support therefor such as alumina.

In the final stage of the present process for producing a non-ionic surface active agent the cyclic hydrocarbon amine is condensed with an alkylene oxide or a polyoxyalkylene glycol to introduce an omega-hydroxypolyoxyalkylene radical on the amino nitrogen atom. In order to form a product having maximum surface activity or detersive properties, the condensation is controlled to obtain a balance between the effect of the hydrophilic polyoxyalkylene chain and the effect of the hydrophobic cyclic hydrocarbon groups in the detergent molecule. The latter optimum balance is obtained when the hydrophobic group of the individual detergent molecule (the hydrocarbon portion of the molecule) balances the effect in solution of the hydrophilic groups (the water solubilizing polyoxyalkylene chain attached to the amino nitrogen atom) so that the molecules of the detergent are capable of orientation in a liquid solvent to form micelle aggregates at relatively low detergent concentrations. When the concentration of detergent in solution is sufficient to form micelles of the oriented detergent molecules, the point of maximum detergency for the particular compound in solution is attained. The chain-length of the polyoxyalkylene group required to form a product of optimum detergency in which the critical hydrophobic-hydrophilic balance is realized varies for different detergent products, depending principally on the chain-length of the alkyl substituent on the cyclic hydrocarbon group of the detergent molecule and the effectiveness of the hydrophilic substituent, as determined by the number of water-solubilizing polyoxypolyalkylene units in the molecule and the ratio of oxygen to carbon in the chain. Thus, of the various species of alternative reactants herein provided, the selection of the most suitable polyoxyalkylene glycol or alkylene oxide for condensation with the cyclic hydrocarbon amine is a matter of trial for each cyclic hydrocarbon amine reactant to determine the point at which optimum detergency or other optimum surface active property is observed. It is now known that in the mono-nuclear cyclic hydrocarbon series, including the naphthenes as well as benzene series, the alkyl group attached to the ring preferably contains at least 5 but generally not more than about 20 carbon atoms per alkyl group, and preferably from about 9 to about 15 carbon atoms per group. Suitable water-soluble and water-dispersible detergents are prepared from the above-mentioned mono-nuclear cyclic hydrocarbons when the alkyl cyclic hydrocarbon amine is condensed with a polyoxyalkylene glycol containing from 2 to about 30 polyoxyalkylene units per molecule, said units being distributed either in one polyoxyalkylene chain on the amino nitrogen atom or as 2 chains of polyoxyalkylene groups containing from 2 to 15 oxyalkylene units per chain. In the alkyl di-cyclic hydrocarbon series, the long-chain alkyl substituent attached to the cyclic hydrocarbon nucleus may contain from about 5 to about 9 carbon atoms per alkyl group (in order for the ultimate product to be water-soluble or water-dispersible) and for such compounds the polyoxyalkylene group substituted on the amino nitrogen atom may also contain from 2 to about 50 oxyalkylene units per group or may be divided between 2 polyoxyalkylene chains on the nitrogen carbon atom. The factor which determines whether 1 or 2 polyoxyalkylene chains are formed on the amino nitrogen atom is dependent upon whether the cyclic hydrocarbon amine contains 2 active hydrogen atoms attached to the amino nitrogen atom (that is, a primary amine) when condensed with the polyoxyalkylene glycol (or alkylene oxide) or whether 1 of the active hydrogen atoms is replaced with a non-condensable hydrocarbon group, such as alkyl containing up to about 5 carbon atoms per group, phenyl, alkylphenyl, such as tolyl, or aralkyl such as benzyl (a secondary amine).

Of the polyoxyalkylene glycols utilizable in the present process for condensation with the cyclic hydrocarbon amine, the poly-(oxyethylene), poly-(oxypropylene), poly-(oxybutylene) and poly-(oxyamylene) glycols produce suitable water-soluble detergent products. If the general formula: $HO(ZO)_nH$ represents glycols utilizable in the present process, Z is an alkylene group containing from 2 to 5 carbon atoms per group, and $n$, which is a whole number representing the average number of oxyalkylene units per glycol molecule, has a value of from about 2 to about 50, preferably from about 2 to about 20. For the poly-(oxyethylene) glycols, the preferred members of this series have an average molecular weight up to about 500, comprising a mixture of glycols containing components having molecular weights of from about 50 to about 600, more or less. Of the various polyoxyalkylene glycols utilizable in the process, the poly-(oxyethylene) glycols are preferred because of their generally greater water-solubilizing properties on the cyclic hydrocarbon or alkylcyclic hydrocarbon amine with which the glycol is condensed. Suitable detergent products are also prepared from the mono-ethers and the mono-esters of the polyoxyalkylene glycols. The use in the present specifications and claims of the term: "polyoxyalkylene," whether in reference to a substituent group or to the glycol species of the oxy-compound reactant, it is intended that such term be the full equivalent of "poly-(oxyalkylene)" or polyoxypolyalkylene.

The condensation of the alkyl cyclic hydrocarbon amine with the polyoxyalkylene glycol or alkylene oxide is effected thermally by heating a mixture of the alkylene oxide and hydrocarbon amine reactant or the polyalkylene glycol and amine to a temperature of from about 50° to about 200° C., preferably at temperatures of from about 100° to about 160° C., the reaction generally being effected at a superatmospheric pressure sufficient to maintain the reactants substantially in liquid phase within the reactor and until the chain-length of the polyoxyalkylene group is sufficient to impart the desired degree of detergency and water-solubility to the ultimate condensation product. For this purpose, the reaction is desirably conducted in a stirred pressure autoclave at pressures of from about 2 to about 50 atmospheres. The reaction is promoted by the presence of basic catalysts, such as sodium hydroxide, pyridine, tri-methyl amine, etc. in the reaction mixture, particularly when the presence of a long-chain polyoxy-polyalkylene group in the detergent product is desired. The condensation product may also be formed by thermally reacting the cyclic hydrocarbon amine with an α,ω-polyoxypolyalkylene glycol chlorohydrin, in the presence of a base or basic catalyst; thus, the reactant referred to herein as an oxy-compound also includes the above-specified halohydrins.

Compounds formed in the present process of the above type in which an alkylene oxide or polyoxyalkylene glycol is condensed with the cyclic hydrocarbon amine are substantially non-ionic or slightly cationic detergents or surface active agents, the detergency and water-solubility of which depend upon the number of oxyalkylene units in the molecular structure of the compound, the number of carbon atoms in the alkylene group of the poly-(oxyalkylene) unit comprising the hydrophilic portion of the molecule and the number and chain length of the alkyl group or groups attached to the cyclic hydrocarbon nucleus. Thus, as the number of oxyalkylene units in the hydrophilic portion of the molecule increases, the water-solubility also increases. Further, as the number of carbon atoms in the alkylene portion of the oxyalkylene unit increases, water solubility tends to decrease, when comparison is made between compounds containing the same total number of oxyalkylene units per molecule. Water-solubility may also be increased by reducing the number of carbon atoms in the alkyl side-chain attached to the cyclic hydrocarbon portion of the molecule or by reducing the number of rings in the cyclic hydrocarbon portion of the molecule from 2 to 1. It is to be emphasized that the present types of detergents and surface active agents are not limited to compounds necessarily soluble solely in water, but also concerns compounds soluble in oils or other organic media, with or without the property of being also soluble in water. Thus, the chain length of the hydrophilic polyoxyalkylene radical may be relatively short and the hydrocarbon portion of the molecule predominant. Such compounds are particularly useful non-aqueous surface active agents, utilizable, for example as lube-oil additives which provide oil soluble detergents.

The total number of oxyalkylene units in the hydrophilic substituent attached to the amino nitrogen atom of the compound may be divided between 2 oxyalkylene chains (formed when an N-dihydrogen substituted amine (i. e. a primary amine) is condensed with the polyoxyalkylene glycol or alkylene oxide reactant); alternatively, a single oxyalkylene chain may be attached to the amino nitrogen atom. These are formed when the amino nitrogen atom of the cyclic hydrocarbon amine subjected to the condensation reaction is a secondary amino group, i. e. when it contains only 1 condensable hydrogen atom, the other valence bond of the nitrogen atom thereupon being occupied by non-condensable alkyl, aryl, aralkyl or alkylaryl group.

Further control of the water solubility of the final product may be obtained by substitution of an alkyl or cyclic hydrocarbon substituent directly on the amino nitrogen atom of the cyclic hydrocarbon amine. If the following general structural formula represents the structure of the present nonionic or slightly cationic type of surface active agent:

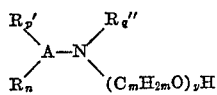

the water-solubility of the product may be reduced or its physical properties further modified by utilizing a secondary amine in which the R" substituent is an alkyl group containing from 1 to 20 carbon atoms, an aryl, alkylaryl or aralkyl group in the final condensation reaction of the intermediate amine with the polyoxyalkylene glycol or alkylene oxide. On the other hand, the water-solubility of the product may be increased by initially utilizing a primary amine in the condensation reaction with the water-solubilizing glycol or alkylene oxide, the R" group of the amine also being hydrogen which undergoes condensation with the polyoxyalkylene glycol or alkylene oxide to introduce a second $—(C_mH_{2m}O)_yH$ group in the ultimate product. When a product of the former type is desired wherein R" is a hydrophobic hydrocarbon radical, the latter R" group is introduced into the structure of the intermediate amine in a preliminary alkylation reaction by reacting the cyclic hydrocarbon primary amine (i. e. the di-hydrogen-substituted cyclic hydrocarbon amine) with an alkyl, aryl, aralkyl or alkylaryl halide containing a transferable hydrocarbon group corresponding to the desired R" substituent of the resulting secondary amine. The alkylation may be represented by the following equation, utilizing an alkyl halide, for example, as the alkylating agent:

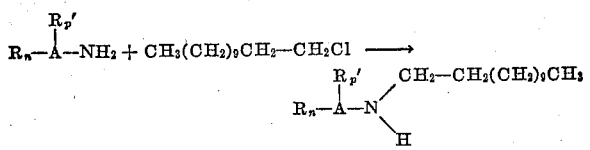

The latter amine-alkylation reaction may be promoted by an alkaline catalyst such as aqueous caustic, soda-lime, etc. and proceeds generally at temperatures of from about 50° to about 150° C. and at a superatmospheric pressure sufficient to maintain the alkyl halide and cyclic hydrocarbon amine in substantially liquid phase. The preferred products of this type are those compounds in which R" is a relatively short chain alkyl group containing from 1 to 5 carbon atoms.

The water-solubility of the final product may be enhanced further by converting the polyoxyalkylene substituted amine to a cationic type of detergent containing a salt-forming electronegative radical and an ammonium nitrogen atom. This conversion may be effected by reacting the non-ionic product formed in the series of initial condensation reactions with an organic or inorganic acid or an acid acting alkyl halide, alkyl sulfate, nitroalkane, a sulfoalkane, the electronegative portion of the molecule forming a negative ion in the resultant molecule, while the organic portion of the reactant or the proton of the acid combines with the non-shared electron of the amino nitrogen atom to form a positively charged ammonium ion. Thus, for example, in the reaction of the slightly cationic amine product of the initial condensation reaction having the following structure:

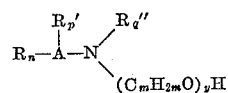

with an alkyl halide having the structure:

the resultant cationic secondary condensation product has the following structure:

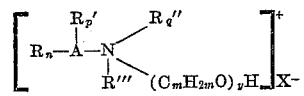

wherein X represents the halide ion of the alkyl halide and R''' represents an alkyl radical attached to the nitrogen atom of the compound by a semi-polar bond. The cationic type of compound formed in the present process from the previously formed non-ionic or slightly cationic product may be prepared simply by adding sufficient inorganic acid (at least a stoichiometric equivalent) to the non-ionic amine to convert the compound to a tetravalent ammonium compound. When utilizing mono- or bivalent hydro-acid, such as sulfuric acid, hydrochloric acid, acetic acid, benzene sulfonic acid, oxalic acid, etc., the group: R''' is hydrogen. In order to form a quaternary ammonium compound in which R''' is alkyl, or alkylaryl, the corresponding R''' halide, sulfate, sulfite etc. is reacted with the non-ionic compound, utilizing at least one molar proportion of halide, sulfate, sulfite, etc. per mol of the non-ionic compound, preferably from about 1.5 to about 2 molar proportions thereof. The reaction of an alkyl halide, for example, with the non-ionic amine may be effected at temperatures of from about 30° to about 100° C. and at reaction conditions sufficient to maintain the reactants in substantially liquid phase conditions. Preferably, the molecular weight of the hydrocarbon portion of the halide, sulfate, sulfite, etc. is controlled to introduce a relatively small R''' group into the structure of the product, thereby reducing to a minimum the reduction in water solubility of the resulting ammonium compound as a result of the introduction of the R" group into the compound. For this reason the simple halides, sulfates and sulfites such as methyl chloride, dimethyl sulfate, ethyl bromide, benzyl chloride, butyl bromide etc. are preferred reactants.

The cationic and non-ionic products of this invention vary in form from relatively viscous liquids (particularly in the case of the polyoxyethylene amines of relatively low molecular weight) to semi-solid waxy and wax-like materials which melt over a wide temperature range, generally below the boiling point of water. The products may be composited with inorganic salts to enhance the water solubility of the amine product. Among the preferred inorganic salts which increase the solubility of the product in water are the water-soluble alkaline earth metal, alkali metal, zinc and aluminum halides, sulfates, sulfites, carbonates, bicarbonates, silicates, and phosphates, the alkaline earth metal halides, such as calcium chloride are preferred for this purpose. Other detergent aids may be added to the present products in order to increase their detersive properties, including such materials as carboxymethylcellulose etc.

The products of this invention may in particular instances be useful as pharmaceuticals or intermediates therefor, as plasticizers and as intermediates for the production of waxes, plastics and resins. For these uses, other substituent groups such as halogen radicals, amino groups, etc. may be introduced into the molecular structure of the products.

The present invention is further illustrated with respect to specific embodiments thereof in the following examples. The examples illustrate preferred reactants, preferred process conditions, etc. and are not intended to define the limits of the present disclosures in strict accordance therewith.

A series of long-chain alkyl, cyclic hydrocarbon amines were prepared by successive reaction steps involving: (1) alkylating benzene or toluene with a long-chain olefinic hydrocarbon containing 6, 9, and 12 carbon atoms per molecule in the several alkylating agents utilized for preparing the hexyl-, nonyl- and dodecyl-benzenes and/or toluenes; (2) nitrating the resultant alkylaromatic hydrocarbon; (3) reducing the resulting nitro-substituted compound alkylate with hydrogen to form the amine; and (4) condensing the resulting amine with ethylene oxide until the desired chain length of the omega-hydroxy-poly-(oxyalkylene) group is obtained. For the sake of convenience, the preparation of dodecyl-substituted aniline will be described as representative of the other members of the various alkyl benzene and alkyl toluene series which are prepared by a similar sequence of reactions.

A sample of dodecylbenzene prepared by the sulfuric acid catalyzed alkylation of benzene with a propylene tetramer fraction boiling from about 170° to about 225° C. was utilized in the following run. The dodecylbenzene alkylate which boiled over a range of from about 275° to about 325° C. was a mixture of dodecylbenzene isomers formed from the isomeric dodecylenes present in the propylene tetramer fraction. A mixture of 120 parts by weight of nitric acid (specific gravity of 1.42) (1.37 molar proportions) and 200 parts by weight of concentrated sulfuric acid was precooled to 0° C. and then added dropwise to 246 weight proportions (1.0 molar proportion) of the above-specified dodecylbenzene, the addition of the acid being accompanied with rapid stirring. The rate of acid addition was also controlled to maintain the reaction temperature at approximately 20–25° C. After all of the acid was added to the mixture, the latter was stirred an additional hour and then heated to 50° C. and stirred another hour at the latter temperature. After cooling, an acid layer separated from the nitro-dodecylbenzene organic layer, the latter being decanted from the acid, washed with an aqueous solution of sodium bicarbonate and dried. Vacuum fractionation of the nitrated product (286 weight proportions) at 3 mm. pressure separated a cut amounting to 7.1 weight proportions of hydrocarbon material boiling in the range of the original alkylate, a second cut boiling from 160–175° C., and amounting to 270 weight proportions, consisting of nitrated product, and a residue of 8 weight proportions. An analysis of the second cut gave a nitrogen content of 4.72% compared to a calculated nitrogen content for mono-nitro dodecylbenzene of 4.83%.

The nitro group of the mono-nitro dodecylbenzene was reduced to the corresponding amino group by catalytic reduction over a suitable hydrogenation catalyst. A 66⅔% solution of the mononitro compound dissolved in absolute methanol was charged into a high pressure autoclave containing 7.5 weight proportions of a hydrogenation catalyst comprising nickel metal supported on kieselguhr. Hydrogen was charged into the pressure autoclave to a pressure of 100 atmospheres, the autoclave mixture was thereafter rotated while maintaining the temperature of the contents of the autoclave at 27° C. for 4 hours. Following the above period of reaction, the contents of the autoclave were filtered to remove the catalyst and the filtrate distilled to remove the methanol solvent. After removal of the solvent at atmospheric pressure, the residue was distilled at 0.9 mm. mercury, absolute, pressure. A distillate boiling from 130–150° C. was separated by distillation, recovered in a yield of 98% of theoretical. Analysis of the product for nitrogen, indicated that it contained 5.31% nitrogen, compared to a calculated value of 5.38 for mono-amino-dodecylbenzene.

In a manner similar to the above described procedure for the preparation of mono-amino-dodecylbenzene (dodecylaniline) the corresponding pentadecyl-, nonyl-, and hexyl-substituted anilines were prepared. The benzene nucleus of these compounds may be converted to the corresponding cyclohexane ring by more drastic hydrogenation. In the case of dodecylaniline, the latter is converted to dodecylcyclohexylamine by dissolving the nitro-dodecylbenzene in double its volume of absolute ethanol and subjecting the resulting solution to hydrogenation in the presence of the aforementioned nickel-kieselguhr catalyst at 135° C. in the presence of hydrogen at a pressure of 100 atmospheres.

The dodecylaniline compound prepared as indicated in the above description is converted to the polyoxyethylene derivative by reacting the amine with ethylene oxide in the presence of a basic catalyst. The amine was charged into a pressure autoclave with about 0.5% of its weight of powdered sodium hydroxide, the autoclave thereafter being flushed with nitrogen, cooled to 0° C. and the ethyleneoxide charged into the autoclave in liquid form and in amounts which varied for the individual products prepared containing various chain length oxyalkylene groups. The autoclave was thereafter stirred while heating it to a temperature of from 140 to 150° C. and while maintaining the latter temperature for a period of from 4 to 5 hours. The product of the condensation was a very thick oil or a wax-like solid, the melting range of which is determined by the amount of ethylene oxide charged into the autoclave which determines the number of polyoxyethylene units per molecule.

The resulting compounds which have the structure of N,N′ - di - (omega-hydroxyethyl-polyoxypolyethylene)-dodecylaniline in which the polyoxypolyethylene substituents contain an average total number of oxyethylene units of from 6 to about 34, were each tested for their detergencies by means of the standard "Launder-O-Meter" procedure wherein soiled swatches of cotton muslin, uniformly soiled with "oildog" (a mixture of carbon black, mineral oil and light hydrocarbon naphtha) were washed at 140° F. in an aqueous solution containing various concentrations of the detergent compounds (noted below in the accompanying Table I) and the results of the test (as measured by the reflectance of light from the laundered muslin swatch) compared with results obtained in a Launder-O-Meter test procedure utilizing equivalent concentration of one of the most effective detergents presently used (dodecylbenzenesulfonate) under otherwise equivalent test conditions.

The following Table I summarizes the properties (that is the detergency, solubility in water and other physical properties) of the various detergent compounds prepared by means of the present process.

TABLE I

*Physical properties of N,N-di-(ω-hydroxyethylpolyoxyethylene)-dodecylanilines containing various polyoxyethylene N-substituent groups*

| Average No. of—OC₂H₄- units per molecule | Percent Reflectance [1] compared to Equal Concentrations of SDBS [2] at Percent Concentrations of— | | | | | Appearance of Product | Solubility in water @ 140° F. |
|---|---|---|---|---|---|---|---|
| | 0.01 | 0.06 | 0.1 | 0.45 | 0.75 | | |
| 6 | | 117 | 114 | 119 | 109 | Semi-Solid | Forms cloudy solution. |
| 8 | | 113 | 113 | 101 | 101 | do | Forms slightly cloudy solution. |
| 12 | 115 | 117 | 115 | 110 | 109 | do | Cloudy solution. |
| 14 | 129 | 135 | 130 | 121 | 114 | Practically Solid. | Soluble. |
| 18 | 200 | 160 | 150 | 112 | 112 | Waxy Solid | Completely soluble. |
| 20 | 180 | 152 | 141 | 108 | 107 | do | Do. |
| 34 | 110 | 102 | 102 | 101 | 101 | do | Do. |

[1] Reflectance measured by measuring in a reflectometer the amount of reflected light from the laundered sample swatch of soiled muslin, the soiled swatch being laundered in a Launder-O-Meter containing an aqueous solution of the detergent of the indicated concentration.

Percent reflectance =
$$\frac{\text{Reflectance of swatch laundered in sample of detergent/reflectance of magnesia}}{\text{Reflectance of swatch laundered in solution of SDBS detergent/reflectance of magnesia}}$$

[2] Standard of comparison is a sodium dodecylbenzene sulfonate-sodium sulfate composition in which $$SDBS/Na_2SO_4 = \frac{40}{60}$$

This composition, containing a builder salt, is more detersive than 100% SDBS itself.

In the case of the dodecylaniline-ethylene oxide condensation products, having the structure of N,N-di-(ω-hydroxyethylpolyoxypolyethylene)-dodecylanilines, the maximum surface activity (detergency as well as wetting power) is exhibited by the compounds containing from 16 to 20 oxyethylene units per molecule, particularly the compound containing 18 oxyethylene units per molecule.

The corresponding dodecyl-cyclohexylamine condensation products of ethylene oxide were prepared by the reduction of the dedecylaniline-ethylene oxide condensation products in the presence of a supported nickel catalyst with hydrogen at 100 atmospheres pressure and at temperatures of about 140° C.

Similarly prepared and tested were the p-hexyl, p-nonyl, p-dodecyl and p-pentadecyltoluidines which contain 2 polyoxyalkylene chains; the corresponding N-methyl analogues (which contain only one polyoxyalkylene chain), the N-hexyl-, N-nonyl-, N-dodecylanilines, and the p-hexyl-(N-hexyl-N-nonyl-)-, p-nonyl-(N-hexyl-N-nonyl), and the dodecyl-(N-hexyl, N-nonyl, N-dodecyl)-anilines, which also contain only one polyalkylene oxide chain on the trivalent nitrogen. All of these compounds show excellent surface active properties and by varying the length and the number of the hydrophilic and/or of the hydrophobic chains, a great variety of surface active products can be obtained. By these variations, for instance, oil-soluble or water-soluble products can be formed. The water-soluble products, on the other hand, can be varied to a great extent depending upon the special use to which the product is put (i. e. for detergent, wetting agent, or emulsifying agent use). Another method of altering the surface active properties of these polyoxyalkylated anilines, or N-alkyl, or N-aralkyl anilines comprises transforming the compounds into their ammonium or quaternary ammonium derivatives.

As an illustrative example, the p-dodecylaniline derivatives may be cited. p-Dodecylaniline readily reacts in an exothermic reaction with ethyleneoxide under the conditions hereinabove described. The reaction being quantitative, the length of the two hydrophilic polyoxyalkylene chains can be determined by the amount of the ethyleneoxide added. Analytically, the carbon content of the product may serve to determine the number of ethyleneoxide units in the resulting polyoxypolyethylene chain; that is, as ethyleneoxide is added to p-dodecylaniline, the percent of carbon in the chain decreases (as well as the hydrogen and nitrogen contents of the compound) and the oxygen content increases. This decrease in the carbon content (the rate of decrease being more rapid than the rate of hydrogen and nitrogen content decrease) comprises an accurate means of controlling the length of the ethyleneoxide chain, up to about 30–40 units per mole.

On the gradual addition of ethylene oxide, the molecule becomes gradually and progressively more soluble in water and at about 16 ethyleneoxide units, the product is completely soluble as a 0.5% aqueous solution. The hydrochloride of the corresponding p-dodecylaniline-ethyleneoxide condensation product is completely soluble as a 0.5% solution when the number of oxyethylene units per molecule is as low as 8. These solubility relationships are shown in the following table for the hydrochloride salt and the non-ionic product respectively, each of which contains a p-dodecyl group on the benzene ring of aniline subjected to condensation with ethylene oxide:

SOLUBILITY

| | Minimum number of alkylene-oxide units per mole to form a clear 0.5% solution |
|---|---|
| p-Dodecylaniline | 16 |
| Hydrogen chloride ammonium salt of above | 8 |

DETERGENCY

| | Number of alkylene oxide units per mole of dodecylaniline to produce a product having the highest detergency |
|---|---|
| p-Dodecylaniline | 16–18 |
| Hydrogen chloride ammonium salt of above | 16–18 |

The results indicated above in Table I demonstrate one of the outstanding advantages of the present N-polyoxyalkylene substituted amines, that is, their superior detergency at low concentration of detergent in water. Thus, in the case of the above indicated N,N-di-(ω-hydroxyethylpolyoxypolyethylene)-dodecylanilines containing an average of 18 total oxyethylene units per molecule, the detergency of the latter product is about 200% of the detergency of sodium dodecylbenzenesulfonate at concentrations of each of 0.01% in aqueous solution. Even at higher concentrations of the respective detergents in water, the detergency of the present product is substantially greater than the alkylarylsulfonates under equivalent test conditions. The products also exhibit remarkable wetting properties when dissolved in water and are thus useful as wetting agents in addition to their use as detergents.

I claim as my invention:

1. A mono-amine compound having its amino nitrogen atom substituted by a benzene hydrocarbon radical having a single nuclear alkyl substituent containing from 6 to 20 carbon atoms, said compound being further characterized in having from 1 to 2 omega-hydroxyalkyl-poly-oxyalkylene radicals attached directly to the amino nitrogen atom through a carbon atom linkage, said compound containing an average total number of from 6 to about 34 oxyalkylene units per molecule, each oxyalkylene unit of which contains from 2 to 3 carbon atoms.

2. The compound of claim 1 further characterized in that the alkylene group of said omega-hydroxyalkyl-polyoxypolyalkylene radical is ethylene.

3. The compound of claim 1 further characterized in that it contains two omega-hydroxyalkyl-polyoxypolyalkylene chains on the same nitrogen atom.

4. The compound of claim 1 further characterized in that said alkyl substituent is dodecyl.

5. The compound of claim 1 further characterized in that said omega-hydroxyalkyl-polyoxypolyalkylene radical is an omega-hydroxypropyl-polyoxypolypropylene group.

6. A mono-amine compound having its amino nitrogen atom substituted by a cyclic hydrocarbon radical selected from the group consisting of benzene and cyclohexyl radicals, said cyclic hydrocarbon radical having a single nuclear alkyl substituent containing from 6 to 20 carbon atoms, said compound being further characterized in having from 1 to 2 omega-hydroxyalkyl-polyoxyalkylene radicals attached directly to the amino nitrogen atom through a carbon atom linkage, said compound containing an average total number of from 6 to about 34 oxyalkylene units per molecule, each oxyalkylene unit of which contains from 2 to 3 carbon atoms.

7. An N,N-di-polyoxyethylene-omega-hydroxyethyl-alkylaniline in which the alkyl group is on the benzene nucleus and contains from 6 to 15 carbon atoms and each of the polyoxypolyethylene radicals contains an average of from 2 to about 20 oxyethylene units.

8. An N-N-di-(omega-hydroxyethyl-polyoxypolyethylene)-dodecylaniline in which the dodecyl group is on the benzene nucleus and the polyoxypolyethylene groups contain an average total number of oxyethylene units of from 6 to about 34.

9. An N-N-di-(omega-hydroxyethyl-polyoxypolyethylene)-dodecylaniline containing from 16 to 20 oxyethylene units per molecule and in which the dodecyl group is on the benzene nucleus.

10. An N-N-di-(omega-hydroxyethyl-polyoxypolyethylene)-dodecylaniline containing 18 oxyethylene units per molecule and in which the dodecyl group is on the benzene nucleus.

References Cited in the file of this patent

UNITED STATES PATENTS

| | | |
|---|---|---|
| 1,930,858 | Muller | Oct. 17, 1933 |
| 1,970,578 | Schoeller et al. | Aug. 21, 1934 |
| 2,185,163 | Ulrich | Dec. 26, 1939 |
| 2,187,823 | Ulrich et al. | Jan. 23, 1940 |
| 2,294,299 | Hester | Aug. 25, 1942 |
| 2,432,023 | Lecher | Dec. 2, 1947 |
| 2,445,892 | Swern | July 27, 1948 |
| 2,674,619 | Lunsted | Apr. 6, 1954 |
| 2,677,700 | Jackson | May 4, 1954 |

FOREIGN PATENTS

| | | |
|---|---|---|
| 819,962 | France | July 19, 1937 |